(12) United States Patent
Sundaresan et al.

(10) Patent No.: US 8,151,272 B2
(45) Date of Patent: Apr. 3, 2012

(54) OPTIMIZED USAGE OF COLLECTOR RESOURCES FOR PERFORMANCE DATA COLLECTION THROUGH EVEN TASK ASSIGNMENT

(75) Inventors: Nagaraj Sundaresan, Marlboro, NJ (US); Pamela A. Bogdan, Neptune, NJ (US); Hema Gupta, Morganville, NJ (US); Mary Hahola Rosell, Lincroft, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1031 days.

(21) Appl. No.: 12/098,580

(22) Filed: Apr. 7, 2008

(65) Prior Publication Data

US 2009/0254914 A1 Oct. 8, 2009

(51) Int. Cl.
*G06F 9/46* (2006.01)
(52) U.S. Cl. ....................................................... 718/105
(58) Field of Classification Search .................... 718/105
See application file for complete search history.

(56) References Cited

U.S. PATENT DOCUMENTS

| | | | |
|---|---|---|---|
| 7,154,621 B2 | 12/2006 | Rodriguez et al. | |
| 7,260,647 B2 | 8/2007 | Espieu et al. | |
| 7,272,653 B2 | 9/2007 | Levy-Abegnoli et al. | |
| 7,284,055 B1 | 10/2007 | Oehrke et al. | |
| 2002/0095684 A1* | 7/2002 | St. John et al. | 725/95 |
| 2003/0191795 A1* | 10/2003 | Bernardin et al. | 709/105 |
| 2006/0259680 A1 | 11/2006 | Chandrasekaran | |
| 2008/0066072 A1* | 3/2008 | Yurekli et al. | 718/104 |

* cited by examiner

*Primary Examiner* — Meng An
*Assistant Examiner* — Brian Chew
(74) *Attorney, Agent, or Firm* — Hoffmann & Bacon LLP

(57) ABSTRACT

A method of balancing computer resources on a network of computers is provided employing a two-tier network architecture of at least one High Level Collector as a scheduler/load balancing server, and a plurality Low level Collectors which gather task data and execute instructions. Tasks are assigned priority and weight scores and sorted prior to assignment to Low Level Collectors. Also provided is a computer readable medium including instructions, wherein execution of the instructions by at least one computing device balances computer resources on a network of computers.

16 Claims, 3 Drawing Sheets

OPTIMIZED USAGE OF COLLECTOR RESOURCES FOR PERFORMANCE DATA COLLECTION THROUGH EVEN TASK ASSIGNMENT

BACKGROUND OF THE INVENTION

1. Field of the Invention

The present invention provides a method for the optimized usage of performance statistics collectors in a two-tier architecture including high-level task assignment servers and multiple low-level performance statistics collection servers.

2. Description of the Related Art

Load balancing is an important activity in computers that comprise the Internet. In load balancing, computer resources are assigned based on actual needs in real time. This is a critical task due to tremendous variations in network resource requirements at particular times. For example, a computer server hosting a web site providing tests for college students may experience a huge volume of requests (for example, millions of unique hits) on days when a test is administered and essentially no requests on other days. Likewise, there are peak times for websites hosting shopping engines, and other times when traffic to the shopping engines is minimal. Thus, an important task for computer networks is allocation of resources so that network resources can be efficiently assigned as needed.

Load balancing technology is well known in the prior art. For example, Oerhke et al. in U.S. Pat. No. 7,284,055 describe a load balancing method between application servers and a redirection processor, where the redirection processor collects network statistics, applies weighting factors, and redirects traffic. Levy-Abegnroli and Thubert, in U.S. Pat. No. 7,272,653 describe a method of balancing connections between servers and clients with a scoring system for basing redirect decisions at column 4, lines 27-48. Espieu et al., in U.S. Pat. No. 7,260,647 describe a load balancing method involving polling routers and prioritizing requests. Rodriguez, et al., in U.S. Pat. No. 7,154,621, discloses the need to prioritize tasks and assign resources appropriately at column 22, lines 30-49. Chandrasekaran, in U.S. Publication No. 2006/0259680 also describe, the use of load balancing in the allocation of network resources at page 4, paragraph 48.

However, there remains a need for improved load balancing methods whereby resources are allocated based on task priorities and demand for resources.

SUMMARY OF THE INVENTION

The present invention provides a method for the optimized usage of performance statistics collectors in a two-tier architecture consisting of high-level task assignment servers and multiple low-level performance statistics collection servers.

Thus, in one embodiment of this invention, a method is provided for balancing computer resources on a network of computers, where a plurality of tasks is associated with a High Level Collector, a priority score and a weight score being associated with each of the plurality of tasks;

the plurality of tasks being sorted into a list, wherein the tasks are sorted first by priority score and then by weight score;

each sorted task is assigned into one of two queues, alternately assigning tasks with highest and lowest weight scores to each queue, wherein tasks assigned to the first queue are sorted in descending order from highest to lowest weight, and tasks assigned to the second queue are sorted in ascending order from lowest to highest weight, so that the number of tasks in each queue is substantially evenly balanced; and each task is then assigned to a Low Level Collector by selecting tasks alternatively from each queue, starting from the first task in each queue, and assigning each task as it is selected to the Low Level Collector with the lowest total weight, until all tasks are assigned or the Low Level Collector capacity is reached.

In this method, the plurality of Low Level Collectors may include substantially equivalent processing power, and the method includes assigning the tasks substantially evenly among the plurality of Low Level Collectors. In another embodiment, the plurality of Low Level Collectors may have substantially non-equivalent processing power, where each Low Level Collector has a pre-defined maximum weight score, and tasks are assigned to the plurality of Low Level Collectors until the capacity of one of the Low Level Collectors is attained; and no additional tasks are assigned to any Low Level Collector whose capacity limit would be exceeded if the next task would exceed the capacity limit thereon.

A finite set of types of tasks may be provided, and the weight and priority score for each type of task are dependent on a plurality of factors selected from a network protocol, a software request, and a hardware request. The weight score associated with any particular task is dependent on processing power and resource requirements. The priority score associated with any particular task is dependent on the urgency with which the task must be executed.

The network of computers may be a two-tiered architecture, wherein each High Level Collector assigns tasks to one or more Low Level Collectors. The Low Level Collectors are servers or routers on the network, and each servers or routers receives instructions that are transmitted to a High Level Collector, where the instructions are tasks that are assigned priority and weight scores, and the tasks are sorted, assigned to a queue, and assigned to a Low Level Collector in accord with the method disclosed above.

In another embodiment, this invention provides a method of balancing computer resources on a network of computers, by providing a two-tier architecture of a plurality of Low Level Collectors and at least one High Level Collector, wherein each Low Level Collector has a maximum weight capacity;

providing a set of network task types to a High Level Collector, wherein each type of task comprises a weight and priority;

providing a set of network tasks to the High Level Collector;

sorting the set of tasks into a list, wherein the tasks are sorted first by priority assignment and then by weight;

assigning each sorted task into one of two queues, wherein tasks in descending order from highest to lowest weight are assigned to the first queue, and tasks in ascending order from lowest to highest weight are assigned to the second queue, so that the number of tasks in each queue is substantially evenly balanced; and selecting tasks alternatively from each queue, wherein said selections are performed by the High Level Collector, starting from highest priority group list, and assigning each task as it is selected to the Low Level Collector with lowest weight, until all tasks are assigned or the Low Level Collector capacity is reached.

In another embodiment, this invention provides a computer-readable medium including instructions, wherein execution of the instructions by at least one computing device balances computer resources on a network of computers by:

associating a plurality of tasks with a High Level Collector, a priority score and a weight score being associated with each of the plurality of tasks;

sorting the plurality of tasks into a list, wherein the tasks are sorted first by priority score and then by weight score;

assigning each sorted task into one of two queues, alternately assigning tasks with highest and lowest weight scores to each queue, wherein tasks assigned to a first queue are sorted in descending order from highest to lowest weight and tasks assigned to a second queue are sorted in ascending order from lowest to highest weight, so that the number of tasks in each queue is substantially evenly balanced; and assigning each task to a Low Level Collector by selecting tasks alternatively from each queue, starting from the first task in each queue, and assigning each task as it is selected to the Low Level Collector with the lowest total weight, until all tasks are assigned or the Low Level Collector capacity is reached.

The computer-readable medium may include a plurality of Low Level Collectors with substantially equivalent processing power, and tasks are assigned evenly among the plurality of low-level collectors. In another embodiment, the computer-readable medium includes a plurality of Low Level Collectors with substantially non-equivalent processing power, wherein each Low Level Collector has a predefined capacity limit comprising a maximum weight score, and tasks are assigned to the plurality of Low Level Collectors until the capacity of one of the Low Level Collectors is attained, and no additional tasks are assigned to any Low Level Collector whose capacity limit would be exceeded if the next task would exceed the capacity limit thereon.

The computer-readable medium defines a finite set of types of tasks, and the weight and priority score for each type of task are dependent on a plurality of factors selected from a network protocol, a software request, and a hardware request. The weight score associated with any particular task is dependent on processing power and resource requirements. The priority score associated with any particular task is dependent on the urgency with which the task must be executed.

The computer-readable medium may include a network of computers with a two-tiered architecture, wherein each High Level Collector assigns tasks to one or more Low Level Collectors. The Low Level Collectors may be servers or routers on the network, wherein said servers or routers receive instructions that are transmitted to a High Level Collector, wherein said instructions are tasks that are assigned priority and weight scores, and said tasks are sorted, assigned to a queue, and assigned to a Low Level Collector in accord with the method described above.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

Figure 1:
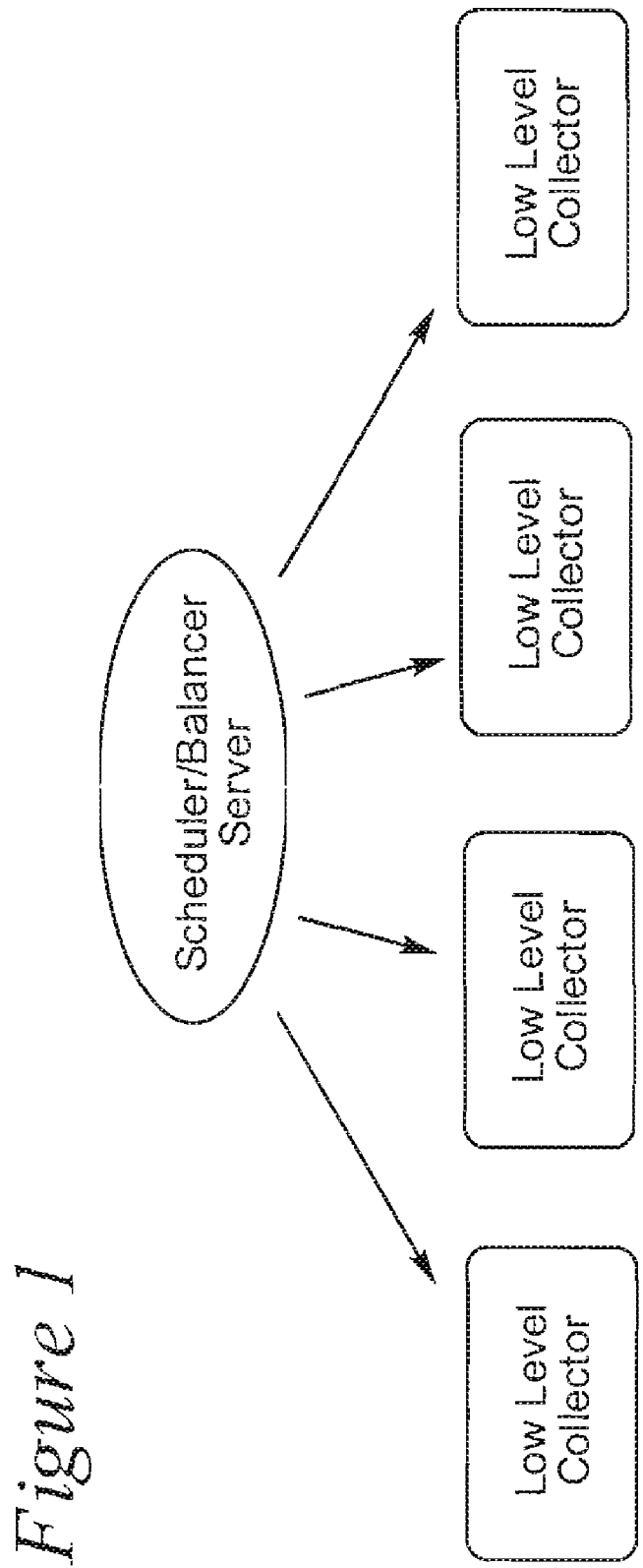
FIG. 1 is a high-level diagram showing a two-tier architecture with a higher layer task-assignment server(s) and low-level data collection layer.

This invention provides a solution for the optimized usage of performance statistics collectors in a two-tier network architecture, employing high level task-assignment servers (High level Collectors, or HLCs) and multiple low-level performance statistics collection servers (Low Level Collectors, or LLCs) that use various network protocols such as CLI (Command Line Interface, or Telnet), SW), HTTP, and FTP. Tasks are commands that need to be executed by the LLCs using these protocols, and these tasks are assigned weights based on the utilization of the server resources, such as a CPU on the low-end collectors. Priorities are also assigned to these tasks based on user requirements. The approach in accordance with the subject invention uses these weights and priorities, capacities of the LLCs, and the unique characteristics of different protocols to assign collection tasks to low-end collectors resulting in an evenly distributed load among LLCs. Each LLC in this invention is a server, a router, or some other network device.

The present invention addresses the need for optimal usage of low-level collectors for performance statistics collection in a two-tier architecture. Prior art methods for task assignments generally distribute tasks using round-robin or cyclic logic, wherein the tasks are assigned without consideration for the task complexity, difference in hardware among low-level collectors, or the characteristics of the different performance data collection protocols. Such task assignments cause some servers to be heavily loaded and others only sparingly used, resulting in under utilization of resources.

In the method of the present invention, a new network performance collection task assignment logic is provided based on weights and priorities. Weighs and priorities are assigned to performance data collection tasks. Furthermore, capacity in terms of weights is also assigned to a pool of low-level collectors. Weights are determined based on the resources utilized by the tasks based on a specified time period. Similarly, priorities are determined based on the user requirements as some tasks are more important to users than others.

"Tasks," as the term is used in this invention, may be software or hardware based. A software based task in a network environment is typically dependent on the network protocol, such as telnet, FTP, POP3, or http. These protocols correspond to applications in the application layer in the TCP/IP or OSI models of network architecture. A hardware task could be a memory utilization or a CPU utilization request.

Each type of task is assigned, in advance, a weight and priority score for use in the instant invention. The weight assignment corresponds to resources necessary to perform the task. The priority assignment roughly corresponds to the urgency with which a task must be performed. Priorities can be assigned based on machine needs or user requirements. For example, a CPU utilization task is likely to be a high priority, since delays in CPU utilization may lead to a generalized slowdown in performance. Similarly, based in user needs, a task necessary for real time voice communication over the network will likely be assigned a higher priority than, for example, a POP3 (email) request. In most embodiments of this invention, weights will be assigned by machine based on actual computational resources required, and priorities will be assigned either by machine or manually.

Given a list of network elements for which the tasks needs to be executed, an HLC acts as a task assignment server, and collects task requests from the network, and assigns a priority and weight to each task. The HLC sorts the tasks by priority and weight.

The HLC then assigns each task to one of two queues. The first queue preferably includes half the router-tasks and the tasks are sorted by descending order of weight starting a the top of the list. The second queue preferably includes the other half of the router-tasks arranged in ascending order of weight starting from the lowest weight tasks at the bottom of the list. Thus, each queue will be substantially evenly balanced in terms of the total number of tasks in the queue. Obviously, if the total number of tasks in a set of tasks is an odd number, there will be a disparity by one in the number of items in each queue.

Task assignments for the LLCs are constructed by alternately selecting tasks from each queue and assigning that task to a available LLC with the lowest total weight score. Before assignment, the weights of the LLCs are initialized to zero. As each assignment is made, the total weight score of each LLC is tallied. The next assignment is made to the LLC with the lowest total weight score. In this manner, the load on the LLCs will be evenly balanced. If two or more LLCs have the same total weight score, which is the low score, the assignment will be randomly made to one of the low weight LLCs. This assignment continues and the queues are processed one-by-one based on weight until either all tasks are assigned, or the capacities of the Low Level Collectors are reached.

Each LLC has a processing capacity, or weight limit, beyond which additional task assignments exceeds its capacity. Depending on the network device, the weight limits for each available LLC may differ, based on processing power, memory available, or other network resources a particular LLC may have available. In the assignment of tasks, once the weight limit of an LLC is reached, that LLC device is taken out of the assignment process, and no additional tasks are assigned to it.

The method in accordance with the present invention ensures optimal utilization of low-level collection architectures in view of increasing requirements to collect and analyze performance statistics of large networks, as networks and network traffic increase in complexity. Further, this approach reduces hardware requirements by evenly distributing performance statistics collection among low-level collectors. This approach takes into account the difference in hardware configuration and capacity of low-level collectors and also the characteristics of the various protocols used for performance statistics collection. This method allows flexibility in assignment through changes in weight based on real-time performance at both the low-level collector level and the individual task level.

The architecture of the inventive system is two-tiered. As shown in FIG. 1, a high level collector (HLC), which is shown as a Scheduler/Balancer server, preferably includes communication links with a plurality of low level collectors (LLC's).

Figure 2:
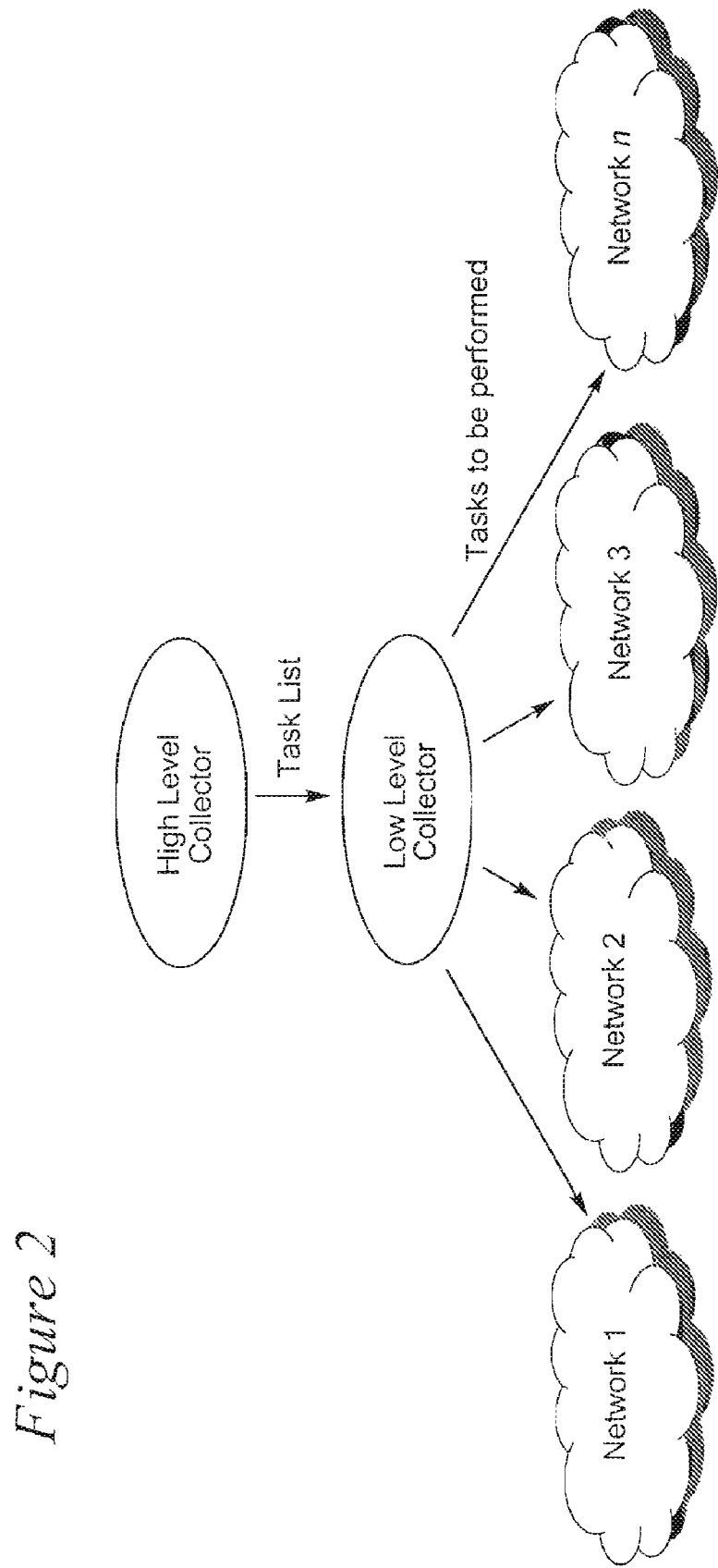
FIG. 2 is a low-level diagram showing the functionality of low level collector servers.

The LLCs are computer servers on a network, and in this invention, the LLCs connect to other network devices or servers as shown in FIG. 2. The HLC generates a task list for each LLC, containing network elements and a protocol for each element. The LLCs perform the data collection tasks according to the task list received from the HLC, and assign specific tasks to a network device according to the instructions from the HLC. The HLC determines what tasks will be sent to which LLC so that the load is evenly distributed among the LLCs. For example, a task list may be:

Task 1—Network 1—SNMP
Task 2—Network 1—CLI,
Task 3—Network 2—CLI
Task 4—Network 3—FTP So for example, Network 1 would perform SNMP and CLI tasks.

Figure 3:
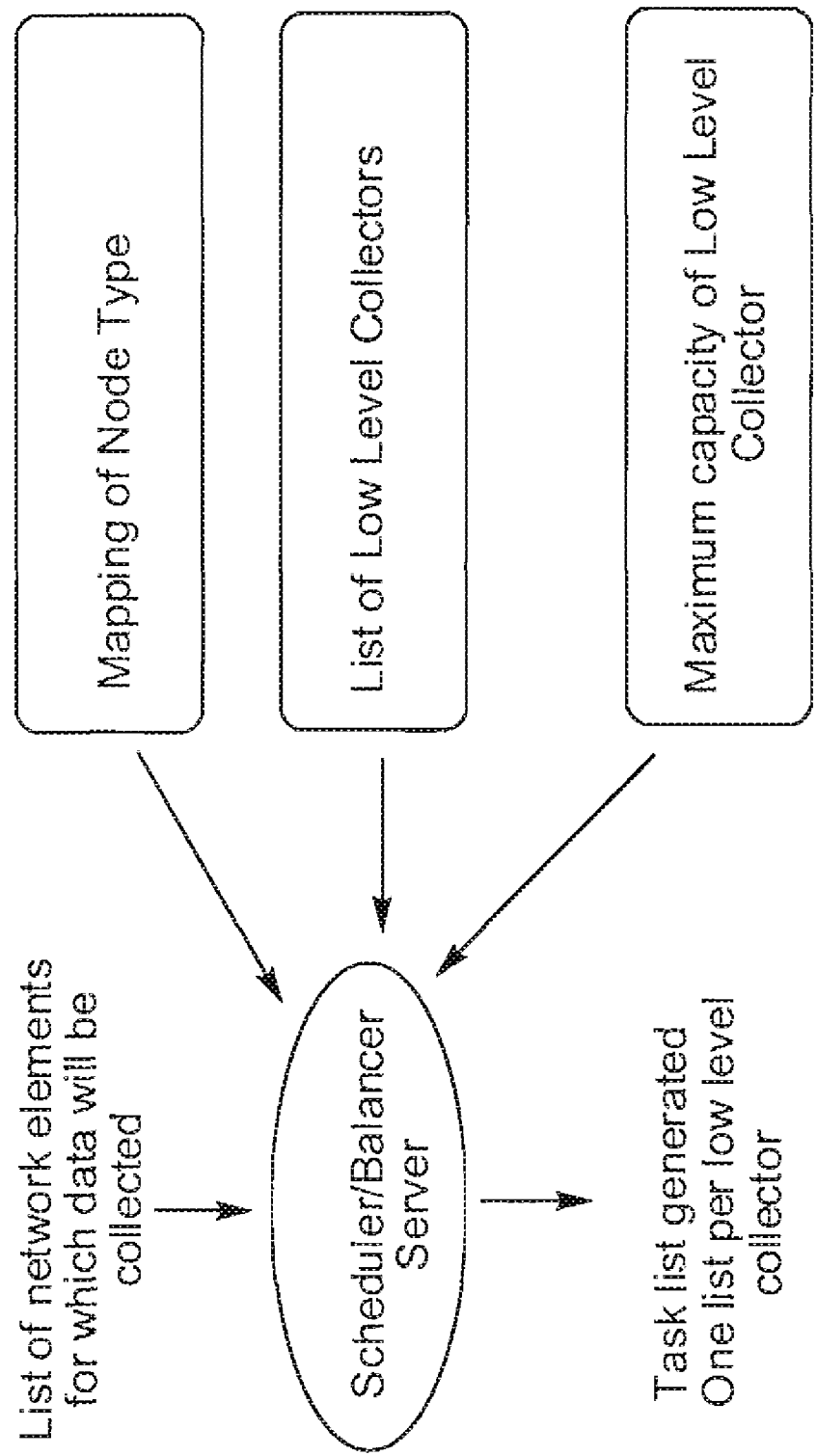
FIG. 3 is a high-level diagram showing a Scheduler/Load Balancer and a functionality of high-level server.

The HLC functions are shown schematically in FIG. 3. The HLC Scheduler/Load Balancer receives lists of tasks, each with an associated node, task type, priority, and weight, and the HLC generates a task list. Additional inputs in this method include a mapping of the node type, with the task type, weight, and priority set by the user, a list of LLCs available, and the capacity of each LLC. The capacity of an LLC is expressed herein in weight units. In very general terms, the task list is a resource allocation tool that instructs an LLC to perform a specific task. Each LLC in the system gets a task list output from the HLC.

In the method of the present invention, each task is given a priority and a weight assignment by the high level collector (HLC). In most embodiments of this invention, priorities are preferably based on the type of request, or on the protocol. For example, any memory utilization request that is a hardware-based task, may have a high-priority assignment. Similarly, an FTP request (network protocol) may have a high-priority assignment. Conversely, a POP3 request (a network protocol) may have a low-priority assignment.

Weight assignments may be based on the type of request, or on subjective and variable factors. For example, among high-priority tasks, a CPU utilization task may have a weight assignment of 10, whereas a memory utilization task may have a weight of 5. The weight assignments in this example are determined in advance, and are based on processing power and resource requirements.

The scheduling and load balancing logic initially sets low-level collector weights to the current load. This can be zero when the scheduler starts for the first time. Next, a network element list is read. The elements on the list may include node name, node type, and network name.

Next, mapping information is read, to obtain tasks for the task list. The mapping information can include a priority assignment, the weight of the assignment, and the protocol type. The mapping information takes into consideration the protocol characteristics when weights are assigned. For example, an FTP task may have a higher weight than an SNMP request.

The task list is then preferably sorted by priority and weight. Within each priority group, tasks are preferably ordered by weight.

For each sorted task list, two queues are created in this method. The first queue preferably includes the upper half of the task list sorted by weight in descending order. The second queue preferably includes the other half of the task list sorted by weight in ascending order.

The method then iterates over the priority task group starting with the highest priority task group. Tasks are assigned to the low-level collectors with the lowest weight, alternating between the two queues for that group. Assignment of tasks continues until all tasks are assigned or the low-level collectors reach maximum capacity.

EXAMPLE 1

In this example, a series of tasks are specified. Each task has a priority and a weight. Additionally, nodes and available low-level collectors are specified. A listing of raw data, which would be transmitted to the HLC is provided. The example shows how the HLC will sort the raw data into two queues, and then make task assignments, alternately taking an assignment from each queue and assigning the task to an LLC such that the weight load on the LLC's are evenly balanced.

Defined Tasks

CPU Utilization (T1)—High-Priority (HP)/Weight 10
Memory Utilization (T2)—High-Priority (HP)/Weight 5
Interface Utilization (T3)—High-Priority (HP)/Weight 3
Disk Utilization (T4)—Low-Priority (LP)/Weight 2
Available Nodes Node 1, Node 2, Node 3
Available Low-Level Collectors: LLC 1 and LLC 2

Raw data on the network. Task Group formed for High-Priority Tasks (node, task, priority, weight)

| Node 1 | T1 | HP | 10 |
| Node 2 | T1 | HP | 10 |
| Node 3 | T1 | HP | 10 |
| Node 1 | T2 | HP | 5 |
| Node 2 | T2 | HP | 5 |
| Node 3 | T2 | HP | 5 |
| Node 1 | T3 | HP | 3 |
| Node 2 | T3 | HP | 3 |
| Node 3 | T3 | HP | 3 |
| Node 1 | T4 | LP | 2 |
| Node 2 | T4 | LP | 2 |

Queue Assignments:

| Queue 1 | Sorted in descending order | | |
|---|---|---|---|
| Node 1 | T1 | HP | 10 |
| Node 2 | T1 | HP | 10 |
| Node 3 | T1 | HP | 10 |
| Node 1 | T2 | HP | 5 |
| Node 2 | T2 | HP | 5 |
| Node 3 | T2 | HP | 5 |

| Queue 2 | Sorted in ascending order | | |
|---|---|---|---|
| Node 2 | T4 | LP | 2 |
| Node 1 | T4 | LP | 2 |
| Node 3 | T3 | HP | 3 |
| Node 2 | T3 | HP | 3 |
| Node 1 | T3 | HP | 3 |

TABLE 1

Task Assignments in Example 1.

| | LLC1 | LLC2 | LLC1-Total | LLC2-Total |
|---|---|---|---|---|
| Initial LLC Weight | | | 0 | 0 |
| First Cycle: Queue1 | Node 1/T1/HP/10 | | 10 | 0 |
| Queue2 | | Node 2/T4/LP 2 | 10 | 2 |
| Queue1 | | Node 2/T1/HP/10 | 10 | 12 |
| Queue2 | Node 1/T4/LP/2 | | 12 | 12 |
| Queue1 | Node 3/T1/HP/10 | | 22 | 12 |
| Queue2 | | Node 3/T3/HP/3 | 22 | 16 |
| Queue1 | | Node 1/T2/HP/5 | 22 | 21 |
| Queue2 | | Node 2/T3/HP/3 | 22 | 24 |
| Queue1 | Node 2/T2/HP/5 | | 27 | 24 |
| Queue2 | | Node 1/T3/HP/3 | 27 | 27 |
| Queue1 | Node 3/T2/HP/5 | | 32 | 27 |

As the processing of the queues progresses, the load on each LLC is preferably evenly distributed. The tasks from each queue are assigned alternately, so that the first task assigned is from queue 1 (Q1), the next task is from Q2, the third task is from Q1, and so forth. Thus, for a list of weights, as in this example, of Q1 starting with 10 and 10, and Q2 starting with 2 and 2, the first 10 is assigned to LLC 1. The next assignment is from Q2, and is assigned to LLC 2. At this stage, LLC 1 has 10 and LLC 2 has 2. The next assignment, of a task with a weight of 10, is to LLC 2. At this stage, LLC 1 has 10 and LLC 2 has 12. The next task is assigned to LLC 1, so both LLCs have 12 weight units after the assignment of four tasks.

In addition, the priority levels are evenly assigned by this method. In this example, there were two low priority tasks, and each LLC was assigned one of the low priority assignments.

The Low-Level Collector processing is also preferably evenly balanced between different LLCs as task processing is alternated between tasks that require maximum and minimum resources, such as CPU utilization (higher resource load) and interface utilization (lower resource load). This results in each LLC having a stable load within its assigned capability.

EXAMPLE 2

This example illustrates how resources would be allocated among LLCs of unequal capacity. The same data is used as in example 1, but assume LLC 2 has a capacity limit of 25.

TABLE 2

Task Assignments in Example 2

| | LLC1 | LLC2 | LLC1-Total | LLC2-Total |
|---|---|---|---|---|
| Initial LLC Weight | | | 0 | 0 |
| First Cycle: Queue1 | Node 1/T1/HP/10 | | 10 | 0 |
| Queue2 | | Node 2/T4/LP 2 | 10 | 2 |
| Queue1 | | Node 2/T1/HP/10 | 10 | 12 |
| Queue2 | Node 1/T4/LP/2 | | 12 | 12 |
| Queue1 | Node 3/T1/HP/10 | | 22 | 12 |
| Queue2 | | Node 3/T3/HP/3 | 22 | 16 |
| Queue1 | | Node 1/T2/HP/5 | 22 | 21 |
| Queue2 | | Node 2/T3/HP/3 | 22 | 24 |
| Queue1 | Node 2/T2/HP/5 | | 27 | 24 |
| Queue2 | Node 1/T3/HP/3 | | 30 | 24 |
| Queue1 | Node 3/T2/HP/5 | | 35 | 24 |

Since LLC 2 has a capacity limit of 25, the Node 2/T2/HP/5 task is unable to be accommodated on LLC 2, since the weight of 5 added to 24 would exceed the 25 weight unit limit. Thus, this task is assigned to LLC 1. If a one (1) weight unit task was available, it could be assigned to LLC 2. Based on the tasks in the example, there were no tasks with a weight of 1, so all subsequent tasks are assigned to LLC 1.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of balancing computer resources on a network of computers, comprising:
   associating a plurality of tasks to a high level collector, priority score and weight score;
   sorting the plurality of tasks into a list, the tasks being sorted first by priority score and then by weight score;
   assigning the plurality of tasks into one of first and second queues, the first queue including highest weight scores sorted in descending order from highest to lowest weight, the second queue including lowest weight scores sorted in ascending order from lowest to highest weight, the quantity of tasks assigned to the first and second queues being substantially equal;
   selecting tasks alternately from the first and second queues; and
   assigning individual selected tasks to one of a plurality of low level collectors, the low level collectors individually having a total weight representing a sum of weight scores associated with tasks assigned thereto, the individual selected tasks being assigned to that low level collector not having reached capacity and having the lowest total weight just prior to assignment of respective ones of the individual selected tasks, the plurality of low level collectors comprising computer resources on a network of computers, the computer resources receiving tasks transmitted to the high level collector.

2. The method of claim 1, wherein the plurality of low level collectors have substantially non-equivalent processing power, wherein each low level collector has a pre-defined capacity limit comprising a maximum weight score, the method further comprising:
   assigning tasks to the plurality of low level collectors until the capacity of one of the low level collectors is attained; and
   assigning no additional tasks to any low level collector whose capacity limit would be exceeded if the next task would exceed the capacity limit thereon.

3. The method of claim 1, wherein a finite set of types of tasks is provided, and the weight and priority score for each type of task are dependent on a plurality of factors selected from a network protocol, a software request, and a hardware request.

4. The method of claim 1, wherein the weight score associated with any particular task is dependent on processing power and resource requirements.

5. The method of claim 1, wherein the priority score associated with any particular task is dependent on the urgency with which the task must be executed.

6. The method of claim 1, wherein the network of computers comprises a two-tiered architecture, wherein each high level collector assigns tasks to one or more low level collectors.

7. The method of claim 1, wherein the computer resources include servers or routers.

8. A method of balancing computer resources on a network of computers, comprising:
   associating a plurality of tasks to a high level collector, priority score and a weight score;
   sorting the plurality of tasks into a list, the tasks being sorted first by priority score and then by weight score;
   assigning the plurality of tasks into one of first and second queues, the first queue including highest weight scores sorted in descending order from highest to lowest weight, the second queue including lowest weight scores sorted in ascending order from lowest to highest weight, the quantity of tasks assigned to the first and second queues being substantially equal;
   selecting tasks alternately from the first and second queues; and
   assigning individual selected tasks to one of a plurality of low level collectors, the low level collectors individually having a total weight representing a sum of weight scores associated with tasks assigned thereto, the individual selected tasks being assigned to that low level collector not having reached capacity and having the lowest total weight just prior to assignment of respective ones of the individual selected tasks, the plurality of low level collectors having substantially equivalent processing power, the plurality of tasks being assigned substantially evenly among the plurality of low-level collectors.

9. A non-transitory computer-readable medium storing instructions, wherein execution of the instructions by at least one hardware computing device balances computer resources on a network of computers by:
   associating a plurality of tasks to a high level collector, priority score and weight score;
   sorting the plurality of tasks into a list, the tasks being sorted first by priority score and then by weight score;
   assigning the plurality of tasks into one of first and second queues, the first queue including highest weight scores sorted in descending order from highest to lowest weight, the second queue including lowest weight scores sorted in ascending order from lowest to highest weight, the quantity of tasks assigned to the first and second queues being substantially equal;
   selecting tasks alternately from the first and second queues; and
   assigning individual selected tasks to one of a plurality of low level collectors, the low level collectors individually having a total weight representing a sum of weight scores associated with tasks assigned thereto, the individual selected tasks being assigned to that low level collector not having reached capacity and having the lowest total weight just prior to assignment of respective ones of the individual selected tasks, the plurality of low level collectors comprising computer resources on a network of computers, the computer resources receiving tasks transmitted to the high level collector.

10. The non-transitory computer-readable medium storing instructions defined by claim 9, wherein the plurality of low-level collectors have substantially equivalent processing power, the plurality of tasks being assigned substantially evenly among the plurality of low-level collectors.

11. The non-transitory computer-readable medium storing instructions defined by claim 9, wherein the plurality of low level collectors have substantially non-equivalent processing power, wherein each low level collector has a pre-defined capacity limit comprising a maximum weight score, the method further comprising:
   assigning tasks to the plurality of low level collectors until the capacity of one of the low level collectors is attained; and
   assigning no additional tasks to any low level collector whose capacity limit would be exceeded if the next task would exceed the capacity limit thereon.

12. The non-transitory computer-readable medium storing instructions defined by claim 9, wherein a finite set of types of tasks is provided, and the weight and priority score for each type of task are dependent on a plurality of factors selected from a network protocol, a software request, and a hardware request.

13. The non-transitory computer-readable medium storing instructions defined by claim 9, wherein the weight score associated with any particular task is dependent on processing power and resource requirements.

14. The non-transitory computer-readable medium storing instructions defined by claim 9, wherein the priority score associated with any particular task is dependent on the urgency with which the task must be executed.

15. The non-transitory computer-readable medium storing instructions defined by claim 9, wherein the network of computers comprises a two-tiered architecture, wherein each high level collector assigns tasks to one or more low level collectors.

16. The non-transitory computer-readable medium defined by claim 9, wherein the computer resources include servers or routers.

* * * * *